United States Patent
Okajima

(10) Patent No.: US 6,348,267 B1
(45) Date of Patent: Feb. 19, 2002

(54) COATED FILM

(75) Inventor: Nariaki Okajima, Tokyo (JP)

(73) Assignee: Sharp Kabuhsiki Kaisha, Osaka (JP)

( * ) Notice: Subject to any disclaimer, the term of this patent is extended or adjusted under 35 U.S.C. 154(b) by 0 days.

(21) Appl. No.: 09/437,911

(22) Filed: Oct. 9, 1999

(30) Foreign Application Priority Data

Nov. 10, 1998 (JP) .......................................... 10-318643

(51) Int. Cl.⁷ ........................ B32B 27/08; B32B 27/30; B32B 27/36; B32B 27/40
(52) U.S. Cl. .................... 428/423.7; 428/480; 428/483; 428/903.3; 428/910; 526/258; 526/260
(58) Field of Search .............................. 428/423.7, 480, 428/483, 903.3, 910; 526/258, 260, 341, 342, 346, 347, 347.1

(56) References Cited

U.S. PATENT DOCUMENTS 5,087,603 A   2/1992   Izubayashi et al. ......... 503/226
5,587,410 A * 12/1996   Kanaida et al. ............. 523/410
5,990,226 A * 11/1999   Arita et al. .................. 524/516

FOREIGN PATENT DOCUMENTS

| | | | |
|---|---|---|---|
| GB | 1134050 | * | 11/1968 |
| JP | 2-60941 | | 3/1990 |
| JP | 7-242758 | | 9/1995 |
| JP | 08-169096 A | * | 7/1996 |
| JP | 10-180968 | | 7/1998 |

* cited by examiner

*Primary Examiner*—Vivian Chen
(74) *Attorney, Agent, or Firm*—Dike, Bronstein, et al. of Edwards & Angell; David G. Conlin

(57) ABSTRACT

The present invention relates to a coating film comprising:
  a polyester film and
  at least one coating layer formed by coating a coating solution containing a polyer (A) comprising a copolymer of oxazoline group-containing monomer, (meth) acrylonitrile and styrene, having an equivalent weight of oxazoline group of less than 300 g/equivalent, and drying and stretching thereof.

5 Claims, No Drawings

COATED FILM

BACKGROUND OF THE INVENTION

The present invention relates to a coated film. More particularly, it relates to a stretched polyester film having novel coating layer and showing excellent transparency, gloss, anti-block properties and adhesiveness.

Since stretched polyester films have excellent properties such as mechanical strength, dimensional stability, flatness, smoothness, heat resistance, chemical resistance and transparency, they have been widely used as a base film of magnetic recording medium, a film for printing, magnetic card, synthetic paper, etc.

While the polyester films have such excellent properties, they are poor in adhesiveness, which is a problem common to the plastic films in general. For instance, the polyester films have poor adhesiveness to printing inks (printing ink for cellophane, chlorinated PP ink, ultraviolet curing ink, magnetic ink, etc.), thermal transfer ink, magnetic coatings, adhesives (laminating adhesives, wood adhesives, etc.), topcoating materials (releaser, ink image receiving layer, gelatin, polyvinyl alcohol, polyvinyl acetal, cellulose acetate, cellulose butyroacetate, methyl cellulose, carboxymethyl cellulose, etc.), and deposited metals and inorganic materials (aluminum, silver, gold, ITO, silicon oxide, aluminum oxide, etc.).

As a method of solving the above problem, it is known to provide a coating layer on the polyester film surface. Especially the method in which coating is conducted in the course of the film forming process is preferable in view of economic and characteristics thereof. This technique is called "in-line coating." In a typical instance of this method, coating is conducted after longitudinal stretching and before transverse stretching, and then transverse stretching and heat setting are conducted. Various types of compounds including polyesters, poly(meth)acrylates, polyurethanes, polyvinylidene chloride, polyolefins and silane coupling agents can be used as the coating compounds. Coating with these compounds provides, in many cases, improvement of adhesiveness in some way or other, but on the other hand, it is causative of the phenomenon of the films sticking to each other (so-called "blocking"). In order to prevent such blocking and to improve adhesiveness, a crosslinking agent is further added in many cases.

Generally, the coating layer is hardened when a crosslinking agent is added. So, there arises a problem of a stretching conformability of the coating layer especially when the film is stretched after coating such as mentioned above. More specifically, if the coating layer is poor in stretchability, it fails to be stretched uniformly and may be fractured finely in the polyester film stretching step, thus forming microcracks in the coating layer in many cases. Such cracks in the coating layer cause such defects as reduction of adhesiveness to the topcoats, etc., and clouding of the coating layer due to scattering of light by fine unevenness of the coating layer surface. Thus, the problem arises that even when the base polyester film is not transparent, glossiness of the film surface lowers.

Therefore, in production of the coated and stretched polyester films, there is required incorporation of a crosslinking agent which is capable of satisfying the above-said antagonistic requirements simultaneously. As this type of crosslinking agent, the oxazoline-based crosslinking agents (for instance, those disclosed in Japanese Patent Publication (KOKOKU) No. 8-2979) have generally been known, but the desired properties can not be obtained when these crosslinking agents are simply applied to the method in which coating is performed in the polyester film forming process.

As a result of the present inventors' earnest studies to solve the above problem, it has been found that by forming a coating layer on a polyester film by applying on the film a coating solution containing a copolymer comprising (meth)acrylonitrile, styrene and an oxazoline-containing monomer, the above problem can be solved.

The present invention has been attained on the basis of the above finding.

SUMMARY OF THE INVENTION

The object of the present invention is to provide a polyester film which has excellent transparency and glossiness of the coating layer and also is excellent in adhesiveness and anti-block properties.

To attain the above aim, in the first aspect of the present invention, there is provided a coating film comprising:

a polyester film and at least one coating layer formed by coating a coating solution containing a polymer (A) comprising a copolymer of oxazoline group-containing monomer, (meth) acrylonitrile and styrene, having an equivalent weight of oxazoline group of less than 300 g/equivalent, and drying and stretching thereof.

DETAILED DESCRIPTION OF THE INVENTION

The present invention will be described in detail below.

The polyester constituting the polyester film of the present invention is the one obtained by using an aromatic dicarboxylic acid or an ester thereof and a glycol as the main starting materials. Examples of the preferable polyester have not less than 70% of the recurring structural units of ethylene terephthalate units, ethylene-2,6-naphthalate units, 1,4-cyclohexane terephthalate units or ethylene isophthalate units, and are especially preferably polyethylene terephthalate and polyethylene-2,6-naphthalate. It may contain other components as far as the above condition is met.

As the aromatic dicarboxylic acid, it is possible to use, for example, terephthalic acid, 2,6-naphthalenedicarboxylic acid, isophthalic acid, phthalic acid, adipic acid, sebasic acid, oxycarboxylic acids (such as p-oxyethoxybenzoic acid) and the like either singly or as a mixture of two or more of them. As the glycol, ethylene glycol, diethylene glycol, propylene glycol, butanediol, 1,4-cyclohexanedimethanol, neopentyl glycol, polyalkylene glycol and the like can be used either singly or as a mixture of two or more of them.

The intrinsic viscosity of these polyesters is usually not less than 0.45, preferably in the range of 0.50 to 1.0, more preferably 0.52 to 0.80. When the intrinsic viscosity is less than 0.45, there may arise the problems such as reduced productivity in manufacture of the film and reduced mechanical strength of the produced film. On the other hand, it is preferable that the intrinsic viscosity does not exceed 1.0 in view of melt extrusion stability of the polymer.

In the polyester film of the present invention, it is possible to contain the particles in the polyester so as to form appropriate projections on the film surface to provide proper slip characteristics to the film to thereby improving its handling qualities. Examples of such particles usable in the present invention include the inorganic particles such as the particles of calcium carbonate, calcium phosphate, silica, kaolin, talc, titanium dioxide, alumina, barium sulfate, calcium fluoride, lithium fluoride, zeolite, molybdenum sulfide, etc., the organic particles such as the particles of crosslinked polymers, calcium oxalate, etc., and the precipitated particles produced in polyester polymerization.

The size and amount of the particles to be contained in the film in the present invention, although variable depending on the purpose of use of the film, are generally as described below. The average particle size is preferably in the range of 0.005 to 5.0 μm, more preferably 0.01 to 3.0 μm. When the average particle size exceeds 5.0 μm, the film surface is roughened to an excess degree. Also, in a thin film, the insulating performance may deteriorate. Further, the particles become liable to fall off the film surface, causing so-called "drop-off of particles" in use of the film. When the average particle size is less than 0.005 μm, the effect of improving the slip characteristics of the film tends to lower because of insufficient formation of the projections by the particles. That is, the effect of improving the slip characteristics may not be provided unless the particles are contained in large quantities, but on the other hand, mechanical properties of the film may be impaired if the particles are added in large quantities.

The content of the particles is preferably not less than 30% by weight, more preferably 0.010 to 20.0% by weight, based on the weight of polyester. When the particle content exceed the above-defined range, mechanical properties of the film may be deteriorated. The lower threshold content varies depending on the purpose of use of the film. The smaller the particle content, the better for a high-transparency film. A smaller particle content is also preferable for providing appropriate slip characteristics. In use for magnetic recording, slip characteristics of the film is an important quality factor, and usually a particle content of at least 0.1% by weight is necessary although it is variable depending on the size of the particles to be added. In the case of a white film produced by adding a white pigment such as calcium carbonate or titanium oxide, a particle content of not less than 2% by weight is usually needed. This is required in the case of producing a film with a high light-shielding effect; the lower threshold value of the particle content may be smaller in the case of a half-transparent film.

It is possible to contain in the film two or more types of these particles or the particles of the same type but differing in size. In either case, it is preferable that the average size of the particles contained in the film and their total content fall in the above-defined ranges.

In producing the particle-containing polyester, the particles may be added either in the course of the polyester synthesis or directly to the polyester. In case where the particles are added in the course of the polyester synthesis, it is preferable to use a method in which a slurry is formed by dispersing the particles in ethylene glycol or the like, and this slurry is added in a preferable phase of the polyester synthesis. On the other hand, in case where the particles are added directly to the polyester, a method is preferably used in which the dried particles or a slurry thereof formed by dispersing the particles in water or an organic solvent having a boiling point of not more than 200° C. is added and mixed with the polyester by using a double-screw extruder. If necessary, the particles to be added may have been subjected to such treatment(s) as pulverization, dispersion, classification and filtration before addition.

In order to adjust the particle content, a method in which first a master material containing the particles in a high concentration is prepared in the manner described above, and in the film forming process, this master preparation is diluted with a material which is substantially free of the particles to thereby adjust the particle content, is preferably used.

As the additives other than the said projection-forming agent, there can be contained as required such materials as antistatic agent, stabilizer, lubricant, crosslinking agent, anti-block agent, antioxidant, colorant (dye and pigment), light screen, ultraviolet absorber, etc. Thus, the polyester film according to the present invention may be, for instance, a colored film or a foamed thin sheet containing a plurality of fine air cells.

The polyester film of the present invention may be of a multi-layer structure as far as the finally satisfied properties of the film satisfy the requirements of the present invention. For instance, it may be a co-extruded laminated film. In this case, the above description relating to the base film applies to the polyester of the outermost surface layer. The films of the other (inner) layers may be made of any type of polyester, plastic material, paper or cloth. Such inner layer films may be, for instance, foamed films containing a plurality of fine air cells.

The polyester film of this invention may be either a monoaxially stretched film or a biaxially stretched film as far as it is a stretched polyester film. However, the biaxially stretched film is more widely used industrially.

Biaxial stretching of the polyester film is preferred by either simultaneous biaxial stretching or successive biaxial stretching, especially successive biaxial stretching is usually used. According to the successive biaxial stretching operation, the melt extruded polyester is cooled on a cooling drum to form a non-stretched film, and the non-stretched film is first stretched in the machine direction (longitudinal stretching) by a set of rolls differing in peripheral speed from each other, and then further stretched while held by a clip in the direction orthogonal to the longitudinal stretching direction. As a modification of this operation, both longitudinal stretching and transverse stretching may be conducted in several stages. Or they may be conducted alternatively until the film is stretched to the desired degree. This technique is used where a high-strength film is produced by a re-stretching method.

Now, the polymer (A) used for the coating composition in the present invention is explained.

The polymers of the oxazoline compounds according to the present invention can be synthesized by using a monomer containing an oxazoline compound as at least one of the starting monomers. As the oxazoline compound, there can be used the 2-oxazoline, 3-oxazoline and 4-oxazoline compounds. Especially the 2-oxazoline compounds are preferable because of highly reactive performance and industrial availability.

Examples of the monomers having oxazoline groups include, but are not limited to, 2-vinyl-2-oxazoline (VOZO), 5-methyl-2-vinyl-2-oxazoline (MVOZO), 4,4-dimethyl-2-vinyl-2-oxazoline (DMVOZO), 4,4-dimethyl-2-vinyl-5,6-dihydro-4H-1,3-oxazine (DMVOZI), 4,4,6-trimethyl-2-vinyl-5,6-dihydro-4H-1,3-oxazine (TMVOZI), 2-isopropenyl-2-oxazoline (IPOZO), 4,4-dimethyl-2-isopropenyl-2-oxazoline (DMIPOZO), 4-acryloyl-oxymethyl-2,4-dimethyl-2-oxazoline (AOZO), 4-methacryloyl-oxymethyl-2,4-dimethyl-2-oxazoline (MAOZO), 4-methacryloyl-oxymethyl-2-phenyl-4-methyl-2-oxazoline (MAPOZO), 2-(4-vinylphenyl)-4,4-dimethyl-2-oxazoline (VPMOZO), 4-ethyl-4-hydroxymethyl-2-isopropenyl-2-oxazoline (EHMIPOZO), and 4-ethyl-4-carboethoxymethyl-2-isopropenyl-2-oxazoline (EEMIPOZO).

Vinyloxazolines easily undergo radical polymerization in the presence of AIBN or BPO to produce a polymer having oxazoline rings in the side chain. Vinyloxazolines also produce similar poly(vinyloxazolines) through anionic polymerization using n-butyl lithium as catalyst. There are the methods not resorting to the use of the monomers having oxazoline rings, for example, a method comprising isomerization reaction of poly(methacryloylazilidine), for the synthesis of poly(vinyloxazolines).

The polymers (A) having oxazoline rings used in the present invention is necessary copolymerized with (meth) acrylonitrile and styrene. Further, the polymer (A) may be copolymerized with other optional copolymerizable monomers. Other monomers may as well be copolymerized, but in either case it is essential that an oxazoline-containing monomer, (meth)acrylonitrile and styrene are copolymerized as the primary three monomeric constituents of the polymer (A). The "primary three monomeric constituents" mean "the three monomers first to third highest in content" in the monomers constituting the oxazoline-containing copolymers, and the existence of other copolymerized monomers may be present therein. Further, since the oxazoline group density needs to be high, the oxazoline equivalent is not more than 300 g/equivalent, preferably not more than 250 g/equivalent. On the other hand, the oxazoline equivalent is usually not less than 97, preferably more than 97, more preferably not less than 100. The contents of (meth) acrylonitrile and styrene units are more than 0% by weight based on the weight of polymer constituting the coating layer, respectively. On the other hand, the content of oxazoline-containing monomer unit is less than 100% by weight based on the weight of polymer constituting the coating layer.

It is also preferable that the polymers (A) are dispersible and soluble in water, especially that they are soluble in water. They may be made dispersible and/or soluble in water by using an organic solvent mixable with water. In this case, a coating film with excellent transparency and anti-block properties is formed even when stretching is conducted after coating.

The coating layer in the present invention may contain the compounds other than the said polymer (A) having oxazoline groups. Examples of the components other than the polymer (A) include binder, crosslinking agent, organic particles, inorganic particles, wax, surfactant, defoaming agent, coating properties improver, thickener, antioxidant, ultraviolet absorber, foaming agent, dye and pigment.

Especially, it is preferable for a good balance of properties to use a combination of a polyester, polymer(s) of vinyl monomer and the particles in addition to a polymer (A) having oxazoline groups. Use of such a combination of materials affords the advantages of minimized coloration in melt extrusion for reuse of the coated film, high adhesion to the base polyester film, good water resistant adhesion, and improved slip characteristics. If necessary, a wax may be additionally used.

As the components of the polyester used as a binder for the coating layer in the present invention, there can be exemplified the polyvalent carboxylic acids and polyvalent hydroxyl compounds such as listed below. Examples of the polyvalent carboxylic acids include terephthalic acid, isophthalic acid, orthophthalic acid, phthalic acid, 4,4'-diphenylcarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebasic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salt, and ester-forming derivatives thereof. Examples of the polyvalent hydroxyl compounds include ethylene glycol, 1,2-propylene glycol, 1,3-propylene glycol, 1,3-propanediol, 1,4-butanediol, 1,6-hexanediol, 2-methyl-1,5-pentanediol, neopentyl gylcol, 1,4-cyclohexane dimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate. The polyesters can be synthesized by the ordinary polycondensation reaction.

Besides the above-mentioned, the composite polymers having such polyester components as so-called acrylic graft polyesters such as disclosed in Japanese Patent Application Laid-Open (KOKAI) No. 1-165633 and polyester polyurethanes produced by chain-lengthening polyester polyols with an isocyanate are also included in the polyesters usable for coating composition binder in the present invention.

The polyester for coating composition binder used in the present invention is preferably the one which is capable of forming a coating composition using water as medium. The polyester may be of the type which is capable of forming a coating composition after forced dispersion by a surfactant or the like, but it is preferably a self-dispersing type polyester having hydrophilic nonionic components such as polyethers or cationic groups such as quaternary ammonium salts, more preferably a water-soluble or water-dispersible polyester resin having anionic groups. The "polyester having anionic groups" is a polyester to which a compound having anionic groups has been attached by means of copolymerization or grafting. The compound is properly selected from sulfonic acid, carboxylic acid, phosphoric acid and their lithium salt, sodium salt, potassium salt and ammonium salt.

The amount of the anionic groups in the polyester is preferably in the range of 0.05 to 8% by weight. When the amount of the anionic groups is less than 0.05% by weight, the produced polyester resin tends to deteriorate in water solubility or water dispersibility, while when the amount of the anionic groups exceeds 8% by weight, water resistance of the coating layer may deteriorate, or the obtained films may become liable to stick to each other (blocking) after moisture absorption.

The polymer of vinyl monomer used for the coating layer in the present invention are the polymers comprising the polymerizable monomers having carbon-carbon double bonds, specifically acrylic or methacrylic monomers. These polymers may be either homopolymers or copolymers. Copolymers of these and other polymers (such as polyesters and polyurethanes), which may be block or graft copolymers, are also included in the concept of said polymers in the present invention. They also include the polymers (polymer mixtures in some cases) obtained by polymerizing the polymerizable monomers having carbon-carbon double bonds in a polyester solution or a polyester dispersion; the polymers (polymer mixtures in some cases) obtained by polymerizing the polymerizable monomers having carbon-carbon double bonds in a polyurethane solution or a polyurethane dispersion; and the polymers (polymer mixtures in some cases) obtained by polymerizing the polymerizable monomers having carbon-carbon double bonds in other polymer solution or dispersion.

The polymerizable monomers having carbon-carbon double bonds usable in the present invention are not specified, but they include as typical examples thereof the following: monomers having various types of carboxyl groups, such as acrylic acid, methacrylic acid, crotonic acid, itaconic acid, fumaric acid, maleic acid, citraconic acid and their salts; monomers having various types of hydroxyl groups, such as 2-hydroxyethyl (meth)acrylate, 2-hydroxypropyl (meth)acrylate, 4-hydroxybutyl (meth)acrylate, monobutylhydroxyl fumalate and monobutylhydroxyl itaconate; various (meth)acrylic esters such as methyl (meth)acrylate, ethyl (meth)acrylate, propyl (meth)acrylate, butyl (meth)acrylate and lauryl (meth)acrylate; various types of nitrogen-containing vinyl monomers such as (meth)acrylamides, diacetone acrylamides, N-methylol acrylamides and (meth)acrylonitrile; styrene and various styrene derivatives such as a-methylstyrene, divinylbenzene and vinyltoluene, and various vinyl esters such as vinyl acetate and vinyl propionate; various silicon-containing polymerizable monomers such as γ-methacryloxypropyltrimethoxysilane, vinyltrimethoxysilane and Silaplane FM-07 (a methacryloyl silicon macromonomer produced by Chisso Corp.); phosphorus-containing vinyl monomers; various types of halogenated vinyls such as vinyl chloride, vinylidene chloride, vinyl fluoride, trifluorochloroethylene, tetrafluoroethylene, chlorotrifluoroethylene and hexafluoropropylene; and various types of conjugated dienes such as butadiene.

The method of producing the polymers from the above-mentioned vinyl monomers is not specified in the present invention; the ordinary methods can be used for their production. For example, the polymers can be obtained by mixing the monomers such as mentioned above and a polymerization initiator with an organic solvent, and heating the mixture with stirring, or by adding dropwise the monomers and a polymerization initiator to an organic solvent while heating with stirring. Also, an organic solvent, the monomers and a polymerization initiator may be polymerized in an autoclave under high pressure. It is further possible to use emulsion polymerization or suspension polymerization using water instead of an organic solvent and if necessary additionally using a surfactant.

As the polyurethane used for the coating layer in the present invention, it is possible to use the known polyurethanes such as disclosed in Japanese Patent Publication (KOKOKU) Nos. 42-24194, 46-7720, 46-10193 and 49-37839, and Japanese Patent Application Laid-Open (KOKAI) Nos. 50-123197, 53-126058 and 54-138098, and their derivatives. These polyurethanes can be produced by reacting polyisocyanates, polyols and if necessary a chain-lengthening agent and/or a crosslinking agent.

Examples of the polyisocyanates usable for the reaction include tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate.

As polyols, it is possible to use polyetherpolyols such as polyoxyethylene glycol, polyoxypropylene glycol and polyoxytetramethylene glycol; polyesterpolyols such as polyethylene adipate, polyethylene-butylene adipate and polycaprolactone; acrylic polyols, and castor oil. Usually, polyols having a molecular weight of 300 to 2,000 are used.

As the chain-lengthening agent or crosslinking agent, there can be used, for instance, ethylene glycol, propylene glycol, butanediol, diethylene glycol, trimethylolpropane, hydrazine, ethylenediamine, diethylenetriamine, 4,4'-diaminodiphenylmethane, 4,4'-diaminodicyclohexylmethane, and water.

The said polyurethanes preferably have an anionic substituent, for example, —$SO_3H$ group, —$OSO_3H$ group, —COOH group and their ammonium salts, alkaline metal salts and alkaline earth metal salts, for bettering solubility in the solvents using water as main medium. The following methods (1) to (3) can be cited as means for preparing these polyurethanes, but the present invention is not limited to these embodiments.

(1) A method using the compounds having an anionic substituent as the polyisocyanate, polyol and chain-lengthening agent.

For instance, a polyisocyanate having an anionic substituent can be obtained by sulfonating an aromatic isocyanate compound. It is also possible to use an isocyanate compound having a sulfuric ester salt or diaminocarboxylic acid salt of an amino-alcohol.

(2) A method comprising reacting a compound having an anionic substituent with the unreacted isocyanate group of the produced polyurethane.

As the compound having an anionic substituent, there can be used the compounds having, for example, a bisulfite, aminosulfonic acid or its salts, aminocarboxylic acid or its salts, sulfuric ester of an amino-alcohol or its salts, or hydroxyacetic acid or its salts as the anionic substituent.

(3) A method comprising reacting an active hydrogen-containing group (OH, COOH, etc.) of the polyurethane with a specific compound.

As the specific compound, there can be used, for example, dicarboxylic acid anhydrides, tetracarboxylic acid anhydrides, sultone, lactone, epoxycarboxylic acid, epoxysulfonic acid, 2,4-dioxo-oxazolidine, isatonic acid anhydrides, and phostone. It is also possible to use the 3- to 7-membered ring cyclic compounds having a salt type group or a group capable of forming a salt after ring opening, such as carbyl sulfate.

The coating composition used in the present invention is preferably the one using water as medium for reasons of hygienic safety, but the composition may contain an organic solvent provided that it does not overstep the concept of the present invention, and that the compound containing such a solvent can be dissolved in water.

The solids concentration of the coating composition used in the present invention is not specifically defined, but it is preferably in the range of 0.4 to 65% by weight, more preferably 1 to 30% by weight, most preferably 2 to 20% by weight.

As means for applying the said coating solution on a polyester film, it is possible to use the various coating devices such as illustrated in Yuji Harasaki: Handbook of Coating Devices and Their Operational Techniques, Sogo Gijutsu Center, 1990, which include forward roll coater, reverse roll coater, gravure coater, knife coater, blade coater, rod coater, air doctor coater, curtain coater, fountain coater, kiss-coater, kiss-roll coater, bead coater, dip coater, screen coater, cast coater, spray coater, and other types of coaters and coating systems such as impregnator and LB coating system.

The pre-coated film may be subjected to a chemical treatment or discharge treatment for improving the coating properties and adhesion of the coating layer to the film. Also, a discharge treatment may be applied on the coating layer after its formation for improving the coating properties and adhesion of the coating layer to the biaxially stretched polyester film of the present invention.

The thickness of the coating layer, determined as that of the dry solids in the final product, preferably falls in the range of 0.005 to 10.0 μm, more preferably 0.01 to 2.0 μm, especially preferably 0.015 to 0.2 μm. The thickness of coating layer is preferably made as small as it can be within the above range. When the thickness of coating layer exceeds 10.0 μm, there may arise problems of blocking, etc., become conspicuous. On the other hand, when the thickness of coating layer is less than 0.005 μm, it may become unable to obtain the preferred performance of the film, and also there tends to take place unevenness or coating holes.

The coating step may be conducted at various stages in the polyester film producing process. For example, coating may be performed on the non-stretched film, the coated film being then stretched mono- or biaxially. Or coating may be conducted on the monoaxially stretched film, and this coated monoaxially stretched film may be offered as a product or may be further stretched to provide a coated biaxially stretched film. The features of the present invention are displayed to the maximum when coating is conducted in the polyester film producing process and the coated film is then stretched. It is especially preferable to carry out coating before tentering as this makes it possible to minimize or unnecessitate enlargement of the drying oven. In a typical embodiment of the process of the present invention, the said aqueous coating composition is applied on a film which has been stretched in the machine (longitudinal) direction, and this coated film is dried, stretched transversely, heat set and taken up. If necessary, the thus treated film may be re-stretched in the longitudinal direction and relaxed. Drying of the coating layer is preferably conducted during preheating before transverse stretching of the polyester film or in the course of transverse stretching. In the similar embodiments of the present invention, coating is conducted on the non-stretched film and this coated film is monoaxially stretched or biaxially stretched simultaneously by a tenter.

The coating layer in the present invention may be of a single-layer or multi-layer structure, or it may be provided as a single layer or plural layers in a multi-layer structure.

A typical film producing process according to the present invention will be described in further detail.

The starting polyester material is supplied to an extruder, melted at a temperature above the melting point of the polyester and extruded as a molten sheet from a slit die. The molten sheet is rapidly cooled to a temperature below the glass transition point and solidified on a rotary cooling drum to obtain a non-stretched sheet of a substantially amorphous state. In this operation, it is preferable to elevate adhesion between the sheet and the rotary cooling drum for improving flatness of the sheet, and for this purpose, an electrostatic pinning method and/or liquid coat adhering method are preferably used in the present invention.

The thus obtained non-stretched coated sheet is first stretched in the machine direction. This stretching is preferably conducted at a temperature in the range of 70 to 150° C. for a stretch ratio of 2.5 to 6 times. Stretching may be conducted in a single step or in two or more steps. In the present invention, the said coating solution is applied on at least one side of the sheet and then dried at an arbitrary stage in the process. Most preferably, this operation is conducted at a stage after longitudinal stretching and before transverse stretching. Then the resulting monoaxially oriented film is once cooled to a temperature below the glass transition point or not cooled but preheated to a temperature range of, for example, 90 to 150° C., and further stretched 2.5 to 5 times, preferably 3.0 to 4.5 times transversely, namely in the direction orthogonal to the direction of longitudinal stretching, to obtain a biaxially oriented film. If necessary, preheating may be reinforced. The thus obtained film is heat treated for a period of one second to 5 minutes with an elongation of not more than 30% or under a limited shrinkage or constant length. In this process, in order to attain an optimal degree of heat shrinkage in the longitudinal direction, it is possible to incorporate an appropriate technique, such as relaxing the film by an amount of not more than 10%, preferably not more than 5%, in the longitudinal direction in the step of heat treatment or after the heat treatment. The heat treatment temperature, though variable depending on the stretching conditions, is preferably in the range of 180 to 250° C., more preferably 200 to 230° C. When the heat treating temperature exceeds 250° C., the film density becomes too high. Also, part of the coating layer may be thermally decomposed. On the other hand, when the heat treating temperature is below 180° C., there results a too high rate of heat shrinkage of the film.

In the manufacture of the coated films according to the process of the present invention, defectives are produced at a certain rate. So, recycling of such defective products is of great industrial interest. If no reclaimed material is mixed in the starting polyester, the production cost elevates, but too much mixing of the reclaimed material causes tinting in the melt extrusion or other steps. It also impairs the dynamic properties of the produced polyester film. The reclaimed material is preferably mixed into the material for the base polyester film. Though variable depending on the polyester film thickness, coating layer thickness, polymer (A) content, production yield and other factors, the reclaimed material is preferably mixed in the base polyester film in such a manner that the amount of the coating layer in the reclaimed coating film is not more than 10% by weight based on the weight of the material for the base polyester film. Mixing of the amount of the coating layer in the reclaimed material in excess of 10% by weight may cause deterioration of the optical and dynamic properties such as mentioned above of the produced film.

The film according to the present invention is the one having excellent adhesiveness, transparency and anti-block properties. This film is therefore particularly preferred for uses where transparency is required. Further, the coating layer provided according to the present invention is of value for the translucent or opaque films, too. It may appear that transparency of the coating layer is not required for the translucent or opaque films, but this does not hold true for all the cases. Transparency of the coating layer is associated with its gloss; a clouded coating layer reduces its gloss. That is, it is of much account for all the polyester films to be able to afford adhesiveness to the base film while maintaining its gloss. A glossy coating layer has a smooth surface, making the films liable to stick to each other. The film according to the present invention has eliminated this problem.

The film of the present invention is a polyester film having a novel coating layer with high transparency and glossiness and also excellent in adhesiveness and anti-block properties.

EXAMPLES

The present invention will be described in further details by showing the examples thereof, which examples, however, are merely intended to be illustrative and not to be construed as limiting the scope of the invention in any way. The evaluation methods used in the examples are as described below. In the following Examples and Comparative Examples, all "parts" are by weight unless otherwise noted.

(1) Intrinsic Viscosity [η](dl/g) of the Polymer 1 g of the polymer was dissolved in 100 ml of a phenol/tetrachloroethane (50/50 by weight) mixed solvent, and the viscosity of the solution was measured at 30° C.

(2) Blend Stability of the Coating Composition

The prepared coating composition was put into a glass bottle and left as it was for one day, after which the degree of generation or inclusion of gel and foreign matter in the coating composition was visually judged. Rating was made according to the following criterion.

A: Excellent. No foreign matter existed.

B: Good. Foreign matter existed only slightly.

C: Rather good. Foreign matter existed to some extent.

D: Bad. Foreign matter existed in a fairly large amount, or thickening of the coating composition was observed.

E: Very bad. Foreign matter existed in bulk, or the coating composition was solidified into a jellylike mass.

(3) Film Haze

Cloudiness of the film was determined according to JIS-K6714 using an Ulbricht sphere hazeometer NDH-20D (mfd. by Nippon Denshoku Kogyo KK). As a measure of transparency, the increment of haze by the coating layer should preferably be not more than 0.3%.

(4) Anti-block Properties

The films were placed one over another and pressed under the conditions of 40° C., 80% RH, 10 kg/cm$^2$ and 20 hours. The pressed films mostly remained stuck to each other. The films were peeled off, measuring the peel strength according to ASTM-D-1893. The higher the peel strength, the stronger is the blocking tendency of the film. When such a film is rolled up, blocking is liable to take place, so that such a film is unsuitable as an industrial product. Even a thick film may be broken when unrolled if such a film has strong blocking tendency. The peel strength, as determined under the above-defined conditions, should preferably be not more than 100 g/cm$^2$.

(5) Adhesiveness

An ultraviolet curing ink was applied and cured on the film surface, and the degree of its adhesion to the film was evaluated under the following conditions.

Ink: Toyo Ink offset printing ink "FD Carton P" (indigo).

Coating: The coating composition was applied to a thickness of 5 μm by an RI tester "RI-2" which is an offset printing device mfd. by Mei-Seisakusho, Ltd.

Curing: The ink was cured by Ushio Electric UV irradiator "UVC-402/1HN:302/1MH" under the conditions of metal halide lamp output of 120 W/cm, line speed of 10 m/min and lamp-film interval of 100 mm.

Adhesivenesss: A Scotch tape test was conducted, and the degree of separation of the ink was evaluated according to the following criterion.

A: Excellent. No separation of ink took place.

B: Good. Ink separated only slightly.

C: Rather good. Ink separated to some extent.

D: Bad. Ink separated to a large extent.

E: Very bad. The ink of the area where the tape was pasted completely separated.

(6) Oxazoline Group Equivalent

A polymer solution containing an oxazoline group was freeze dried and analyzed by $^1$H-NMR, and the oxazoline group equivalent was calculated from the absorption peak strength attributable to the oxazoline group and the absorption peak strength attributable to other monomers.

(Preparation of Coating Compositions)

The water-based coating stock solutions used in Examples and Comparative Examples are shown as follows.

A1: Oxazoline-based Polymer

Monomer composition: 2-isopropenyl-2-oxazoline/ acrylonitrile/styrene=50.5/19.5/30 (wt %)

Offered as a water/propylene glycol monomethyl ether mixed solution of the polymer obtained by copolymerizing the above monomers. This polymer mixed solution can be mixed with water in any desired ratio to form a homogeneous solution.

Oxazoline group equivalent=220 g (solids)/equiv.

A2: Oxazoline-based Polymer

Monomer composition: 2-isopropenyl-2-oxazoline/ acrylonitrile=50.5/49.5 (wt %)

Offered as a water/propylene glycol monomethyl ether mixed solution of the polymer obtained by copolymerizing the above monomers. This polymer mixed solution can be mixed with water in any desired ratio to form a homogeneous solution.

Oxazoline group equivalent=220 g (solids)/equiv.

A3: Oxazoline-based Polymer

Monomer composition: 2-isopropenyl-2-oxazoline/ styrene/butyl acrylate=20/38/42 (wt %).

Offered as a water dispersion of the polymer obtained by copolymerizing the above monomers.

Emulsifier: polyoxyethylene nonylphenyl ether ammonium sulfate salt (used in an amount of 3 wt % of the total amount of the monomers).

Oxazoline group equivalent=555 g (solids)/equiv.

A4: Methoxymethylmelamine (hexa-type)

A5: Polyglycerolpolyglycidyl Ether

B1: Polyvinyl alcohol-based Binder

Polyvinyl alcohol: saponification degree=88 mol %; polymerization degree=ca. 500

B2: Polyester-based Binder

Monomer composition: (acid moiety) isophthalic acid/3a, 4,5,7a-tetrahydro-7-methyl-5-(tetrahydro-2,5-dioxo-3-furanyl)-1,3-isobenzofurandione//(polyol moiety) neopentyl glycol/diethylene glycol=98/2//88/12 (mol %).

Offered as a water dispersion of the polymer obtained by copolymerizing the above monomers.

B4: Polyacrylate-based Binder Monomer Composition: methyl methacrylate/ethyl acrylate/acrylonitrile/N-methylolacrylamide/ methacrylic acid=41/46/7/5/1 (mol %).

Offered as a water dispersion of the polymer obtained by copolymerizing the above monomers.

Emulsifier: polyoxyethylene nonylphenyl ether sodium sulfate (used in an amount of 5 wt % of the total amount of the monomers).

B5: Polyacrylate-based Binder

Monomer composition: methacrylic acid/butyl methacrylate/methyl methacrylate/methacrylic acid-2-hydroxyethyl=15/35/35/15 (mol %).

After solution polymerization in an organic solvent, the produced polymer was subjected to solvent substitution and offered as an aqueous solution.

B6: Polyurethane-based Binder

Offered as a water dispersion of the polyurethane produced by reacting 94 parts by weight of a polyester of the following monomer composition, 6 parts by weight of 2,2-dimethylolpropionic acid and 11 parts by weight of isophorone diisocyanate. The polyurethane was neutralized with triethylamine and then dispersed in water.

Monomer composition of the polyester: (acid moiety) terephthalic acid/isophthalic acid/(diol moiety) ethylene glycol/diethylene glycol=60/40/61/39 (mol %).

C1: Silicon Oxide

Particle size (diameter)=0.07 μm.

Offered as a water dispersion (colloidal silica).

The water-based coating stock solutions as described above were blended to prepare the water-based coatings of the compositions shown in Table 2.

TABLE 2

| Number | Coating compositions (solids) |
| --- | --- |
| S1 | A1/B1 = 95/5 |
| S2 | A2/B1 = 95/5 |
| S3 | A3/B1 = 95/5 |
| S4 | A4/B1 = 95/5 |
| S5 | A5/B1 = 95/5 |
| S6 | B2/ /C1 = 95/ /5 |
| S7 | B2/A1/C1 = 75/20/5 |
| S8 | B2/A2/C1 = 75/20/5 |
| S9 | B2/A3/C1 = 85/10/5 |
| S10 | B2/A3/C1 = 75/20/5 |
| S11 | B2/A3/C1 = 65/30/5 |
| S12 | B2/A4/C1 = 75/20/5 |
| S13 | B2/A5/C1 = 75/20/5 |
| S14 | B4/ /C1 = 95/ /5 |
| S1S | B4/A1/C1 = 75/20/5 |
| S16 | B4/A2/C1 = 75/20/5 |
| S17 | B4/A3/C1 = 75/20/5 |
| S18 | B6/ /C1 = 95/ /5 |
| S19 | B6/A1/C1 = 75/20/5 |
| S20 | B6/A2/C1 = 75/20/5 |
| S21 | B6/A3/C1 = 75/20/5 |
| S22 | B5/ /C1 = 95/ /5 |
| S23 | B5/A1/C1 = 75/20/5 |
| S24 | B5/A2/C1 = 75/20/5 |
| S25 | B5/A3/C1 = 75/20/5 |
| S26 | B3/ /C1 = 95/ /5 |
| S27 | B3/A1/C1 = 75/20/5 |
| S28 | B3/A2/C1 = 75/20/5 |
| S29 | B3/A3/C1 = 75/20/5 |

Comparative Example 1

Polyethylene terephthalate containing 0.005% by weight of $SiO_2$ having an intrinsic viscosity of 0.65 and a particle size (diameter) of 1.5 μm was dried by a conventional method, supplied to an extruder, melted at 290° C., extruded into the form of a sheet, and rapidly cooled on a cooling roll using an electrostatic pinning method to obtain an amorphous sheet. The thus obtained non-stretched sheet was roll stretched 2.5 times at 85° C., followed by 1.3 times stretching at 95° C., in the machine direction. The resulting monoaxially stretched film was led to a tenter, whereby the film was stretched 4.0 times in the transverse direction at 120° C. and heat treated at 235° C. to obtain a biaxially stretched polyester film with the base polyester film thickness of 50 μm. The obtained film was a flat film having high transparency but defective in adhesiveness. Transparency and adhesiveness of the obtained film are shown in Table 3.

Comparative Examples 2 to 5 and Example 1

Monoaxially stretched films were produced in the same way as in Example 1. On one side of each of these films was applied a coating composition shown in Table 2 (Comp. Examples 2–5 and Example 1). The component materials of the compositions shown in Table 2 were as shown in Table 1. In B1, polyvinyl alcohol was used in a small quantity for improving the coating properties of the composition. Then, the films were led to a tenter and thereby dried, stretched transversely and heat treated in the same way as in Comparative Example 1 to obtain the biaxially stretched films. The coating layer of each film was also stretched to have a final dry coating layer thickness of 0.11 μm.

It is seen from the obtained results that the oxazoline-based coating compositions provide better film transparency than the melamine-based and epoxy-based coating compositions. It is also seen that in the oxazoline-based coating compositions, the oxazoline compounds specified in the present invention are outstanding in their effect for providing anti-block properties. It was found that the oxazoline compounds defined in the present invention are especially suited for in-line coating of the polyester films.

Comparative Examples 6 to 12 and Example 2

The coating compositions shown in Table 2 were applied on the base films in the same way as in Comparative Example 2 to obtain the in-line coated films of Comparative Examples 6 to 12 and Example 2. The component materials of the coating compositions used here were as shown in Table 1. The properties of the obtained films are shown in Table 3. In these examples, polyester was used as binder, and various types of crosslinking agent were added in an amount of 20 parts. Here, too, the oxazoline-based compounds excelled in transparency in general. Especially the films of the present invention using A1 were excellent in various properties. A3 differs from A1 in oxazoline group equivalent. So, the films of Comparative Examples 8 to 10 were made in such a manner that the oxazoline groups substantially equal in number to the case of using A1 would be contained in the coating layer. It was found, however, that the film of Example 2 excelled comprehensively in properties of the coating layer. The coating layer of the Example 2 film also showed excellent slip characteristics as it contained the fine particles.

Comparative Examples 13 to 15 and Example 3

The coating compositions shown in Table 2 were applied on the base films in the same way as in Comparative Example 2 to obtain the in-line coated films of Comparative Examples 13 to 15 and Example 3. The component materials of the coating compositions used here were as shown in Table 1. The properties of the obtained films are shown in Table 3. In these examples, poly(meth)acrylate was used as binder, and various types of crosslinking agent were added in an amount of 20 parts. Here, too, the film of the present invention using A1 excelled in various properties.

Comparative Examples 16 to 18 and Example 4

The coating compositions shown in Table 2 were applied on the base films in the same way as in Comparative Example 2 to obtain the in-line coated films of Comparative Examples 16 to 18 and Example 4. The component materials of the coating compositions used here were as shown in Table 1. The properties of the obtained films are shown in Table 3. In these examples, polyurethane was used as binder, and various types of crosslinking agent were added in an amount of 20 parts. Here, too, the film of the present invention using A1 excelled in various properties.

Comparative Examples 19 to 21 and Example 5

The coating compositions shown in Table 2 were applied in the same way as in Comparative Examples 2 to obtain the in-line coated films of Comparative Examples 19 to 21 and Example 5. The component materials of the coating compositions used here were as shown in Table 1. The properties of the obtained films are shown in Table 3. In these examples, poly(meth)acrylate was used as binder, and various types of crosslinking agent were added in an amount of 20 parts. Here, too, the film of the present invention using A1 excelled in various properties.

Comparative Examples 22 to 24 and Example 6

The coating compositions shown in Table 2 were applied in the same way as in Comparative Example 2 to obtain the in-line coated films of Comparative Examples 22 to 24 and Example 6. The component materials of the coating compositions used here were as shown in Table 1. The properties of the obtained films are shown in Table 3. In these examples, poly(meth)acrylate was used as binder, and various types of crosslinking agent were added in an amount of 20 parts. Here, too, the film of the present invention using A1 excelled in various properties.

Comparative Example 25

Polyethylene-2,6-naphthalate (PEN) containing 0.005% by weight of $SiO_2$ having an intrinsic viscosity of 0.68 and a particle size (diameter) of 1.5 μm was dried by a conventional method, supplied to an extruder, melted at 300° C., extruded into the form of a sheet, and rapidly cooled on a cooling roll using an electrostatic pinning method to make an amorphous sheet. The thus obtained non-stretched sheet was roll stretched 3.5 times in the machine direction at 135° C., and this monoaxially stretched film was then led to a tenter for stretching it 4.0 times in the transverse direction at 135° C., and then heat treated at 235° C. to obtain a biaxially stretched polyester film with a base polyester film thickness of 50 μm. The obtained film was flat and had high transparency, but it lacked in adhesiveness. Transparency and adhesiveness of this film are shown in Table 3.

Example 7

The coating composition of Example 2 shown in Table 2 was applied on the polyethylene-2,6-naphthalate film of Comparative Example 25 in the same way as in Example 2 to obtain the in-line coated film of Example 7. The component materials of the coating composition used here were as shown in Table 1. The properties of the obtained film are shown in Table 3. This film had excellent transparency, adhesiveness and anti-block properties.

Example 8

The laminated polyester film obtained in Example 2 was crushed into pellets and added to polyethylene terephthalate in an amount of 20% by weight. The procedure of Example 2 was conducted in otherwise the same way to obtain an in-line coated polyester film. The properties of this film are shown in Table 3. The film assumed a slightly more yellowish tint than the film of Example 2 and had excellent transparency, adhesiveness and anti-block properties.

TABLE 3

| No. | Coating layer Composition | Thickness (μm) | Blend stability |
|---|---|---|---|
| Ex. 1 | S1 | 0.11 | A |
| Ex. 2 | S7 | 0.11 | A |
| Ex. 3 | S15 | 0.11 | A |
| Ex. 4 | S19 | 0.11 | A |
| Ex. 5 | S23 | 0.11 | A |
| Ex. 6 | S27 | 0.11 | A |
| Ex. 7[1] | S7 | 0.11 | A |
| Ex. 8 | S7 | 0.11 | A |
| Comp. Ex 1[2] | — | — | E |
| Comp. Ex 2 | S2 | 0.11 | A |
| Comp. Ex 3 | S3 | 0.11 | A |
| Comp. Ex 4 | S4 | 0.11 | E |
| Comp. Ex 5 | S5 | 0.11 | E |
| Comp. Ex 6 | S6 | 0.11 | C |
| Comp. Ex 7 | S8 | 0.11 | A |
| Comp. Ex 8 | S9 | 0.11 | A |
| Comp. Ex 9 | S10 | 0.11 | A |
| Comp. Ex 10 | S11 | 0.11 | A |
| Comp. Ex 11 | S12 | 0.11 | A |
| Comp. Ex 12 | S13 | 0.11 | A |
| Comp. Ex 13 | S14 | 0.11 | A |
| Comp. Ex 14 | S16 | 0.11 | A |
| Comp. Ex 15 | S17 | 0.11 | A |
| Comp. Ex 16 | S18 | 0.11 | A |
| Comp. Ex 17 | S20 | 0.11 | A |
| Comp. Ex 18 | S21 | 0.11 | A |
| Comp. Ex 19 | S22 | 0.11 | C |
| Comp. Ex 20 | S24 | 0.11 | A |
| Comp. Ex 21 | S25 | 0.11 | A |
| Comp. Ex 22 | S26 | 0.11 | C |
| Comp. Ex 23 | S28 | 0.11 | A |
| Comp. Ex 24 | S29 | 0.11 | A |
| Comp. Ex 25[3] | — | — | E |

| No. | Film properties Haze | Anti-block properties | Adhesiveness |
|---|---|---|---|
| Ex. 1 | 0.7 | 95 | A |
| Ex. 2 | 0.7 | 17 | A |
| Ex. 3 | 0.9 | 88 | A |
| Ex. 4 | 0.8 | 89 | A |
| Ex. 5 | 0.8 | 29 | A |
| Ex. 6 | 0.7 | 43 | A |
| Ex. 7[1] | 0.7 | 10 | A |
| Ex. 8 | 0.7 | 17 | A |
| Comp. Ex 1[2] | 0.7 | 0 | E |
| Comp. Ex 2 | 0.7 | 230 | A |
| Comp. Ex 3 | 0.7 | 288 | A |
| Comp. Ex 4 | 0.9 | 21 | E |
| Comp. Ex 5 | 1.1 | 10 | E |
| Comp. Ex 6 | 0.8 | 21 | C |
| Comp. Ex 7 | 1.2 | 25 | A |
| Comp. Ex 8 | 2.0 | 0 | A |
| Comp. Ex 9 | 2.5 | 0 | A |
| Comp. Ex 10 | 2.5 | 0 | A |
| Comp. Ex 11 | 2.0 | 0 | A |
| Comp. Ex 12 | 5.3 | 9 | A |
| Comp. Ex 13 | 1.2 | 121 | A |
| Comp. Ex 14 | 1.1 | 126 | A |
| Comp. Ex 15 | 1.2 | 134 | A |
| Comp. Ex 16 | 0.8 | 171 | A |
| Comp. Ex 17 | 0.8 | 110 | A |
| Comp. Ex 18 | 0.8 | 79 | A |
| Comp. Ex 19 | 1.4 | 49 | C |
| Comp. Ex 20 | 2.4 | 25 | A |
| Comp. Ex 21 | 8.6 | 23 | A |
| Comp. Ex 22 | 0.8 | 61 | C |
| Comp. Ex 23 | 0.8 | 124 | A |
| Comp. Ex 24 | 1.2 | 62 | A |
| Comp. Ex 25[3] | 0.7 | 0 | E |

[1] PEN
[2] No coating
[3] PEN

What is claimed is:

1. A coated film comprising:
   a polyester film and
   at least one coated layer formed by coated a coated solution containing a polymer (A) comprising a copolymer of oxazoline group-containing monomer, (meth)acrylonitrile and styrene, having an equivalent weight of oxazoline group of less than 300 g/equivalent, and drying and stretching thereof.

2. A coated film according to claim 1, wherein the polymer (A) is water-soluble.

3. A coated film according to claim 1, wherein the coated layer further contains at least one resin selected from the group consisted of polyesters, polymer of vinyl monomers and polyurethanes.

4. A coated film according to claim 1, wherein the polyester film is polyethylene terephthalate film or polyethylene 2,6-naphthalate film.

5. A coated film according to claim 1, wherein the polyester film contains a reclaimed coated film as defined in claim 1 and the amount of the coated layer in the reclaimed coated film is not more than 10% by weight based on the weight of the polyester film.

* * * * *

UNITED STATES PATENT AND TRADEMARK OFFICE
CERTIFICATE OF CORRECTION

PATENT NO. : 6,348,267 B1
DATED : February 19, 2002
INVENTOR(S) : Nariaki Okajima It is certified that error appears in the above-identified patent and that said Letters Patent is hereby corrected as shown below:

<u>Title page,</u>
Item [22], Filed: please change "October 9, 1999" to -- November 9, 1999 --.
Item [73], Assignee: please change "Sharp Kabushiki Kaisha, Osaka" to -- Mitsubishi Polyester Film Corporation, Tokyo --.

Signed and Sealed this

Twenty-fourth Day of September, 2002

*Attest:*

JAMES E. ROGAN
*Attesting Officer*     *Director of the United States Patent and Trademark Office*